UNITED STATES PATENT OFFICE.

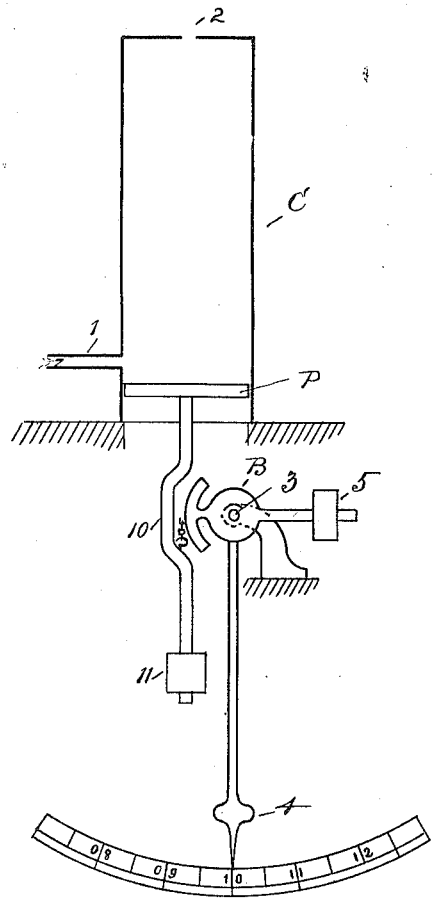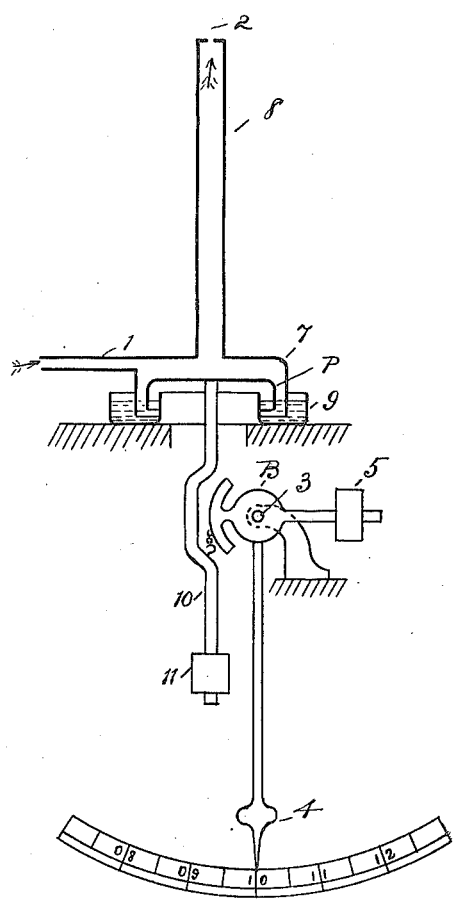

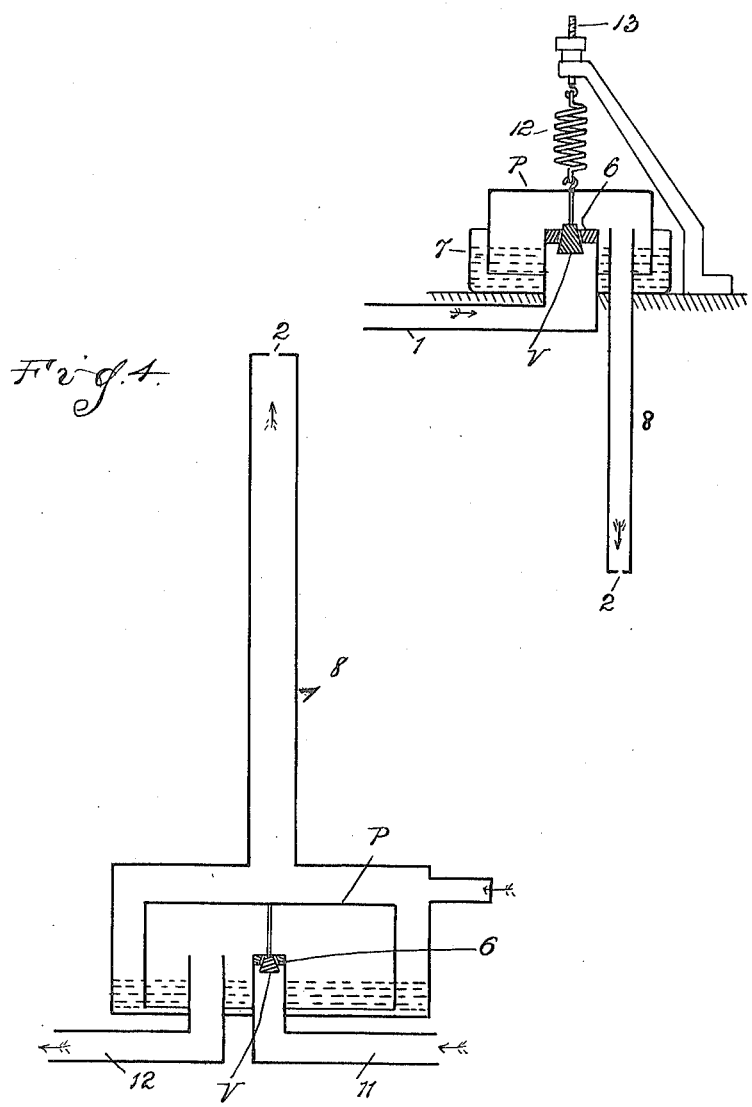

JOHN FREDERICK SIMMANCE AND JACQUES ABADY, OF LONDON, ENGLAND.

APPARATUS FOR AND ACTUATED BY GASES OF VARYING DENSITY.

1,264,985.  Specification of Letters Patent.  Patented May 7, 1918.

Application filed November 25, 1912, Serial No. 733,548. Renewed November 27, 1916. Serial No. 133,812.

*To all whom it may concern:*

Be it known that we, JOHN FREDERICK SIMMANCE and JACQUES ABADY, subjects of the King of Great Britain and Ireland, residing at London, England, have invented certain new and useful Improvements in Apparatus for and Actuated by Gases of Varying Density, of which the following is a specification, reference being had therein to the accompanying drawings.

This invention relates to apparatus for, or actuated by, gas of varying density. The apparatus comprises means for weighing a definite volume of the gas against a suitably poised balance arm, spring, buoyant float, or the like. The said arm, spring, or float may be made to actuate a pointer, pen arm, or the like which can be arranged to indicate or give a record of the specific gravity of the gas. Or the said balance arm, spring, or float may be used to actuate a valve which in turn may control the rate of outflow of the gas. Many other useful applications of the apparatus are possible.

Figure 1 represents diagrammatically an apparatus for indicating the density of gas; Fig. 2 shows a practical construction employing the principle diagrammatically illustrated in Fig. 1; Fig. 3 shows an apparatus for controlling the flow of gas; and Fig. 4 shows a modification for the same purpose.

Fig. 1 shows diagrammatically one form of the apparatus. The gas is admitted to the cylinder C by the inlet pipe 1, and is discharged by the vent hole 2 at the top. A piston P fitting without friction in the cylinder is suitably supported from a pendulum balance D, pivoted at 3, which may be provided with a long index pointer 4 and with an adjustable counter weight 5. When the cylinder C is filled with air the counterweight 5 is adjusted so that the index pointer is opposite the mark 1.00 of the scale. When the cylinder is filled with a gas of greater density than air, the piston will be forced downward and the index pointer moved to the right, until equilibrium is established. If the cylinder is filled with a gas lighter than air, the piston moves upward and the index pointer moves to the left. If the gas varies in density at different intervals of time, fresh supplies of the gas must be passed into the cylinder from time to time, for which purpose the inlet pipe 1 is connected to the source of supply of the gas.

It will be evident that the apparatus as heretofore described weighs directly the volume of gas contained in the cylinder. For, the gaseous pressure on the upper side of the piston F is equal to the pressure of the atmosphere on the upper end of the cylinder at the level of the vent hole 2, plus the weight of gas contained in the cylinder. The atmospheric pressure on the under side of the piston P is equal to the atmospheric pressure on the upper end of the cylinder plus the weight of a volume of air equal to that of the cylinder. Thus the resultant of the gaseous and atmospheric pressures on the piston which is to be equilibrated by the pendulum balance is the difference between the weights of the cylinder volume of the gas and of atmospheric air.

The delicacy of the measurements given by the apparatus depends on having a large volume of gas contained by the cylinder C to be weighed by the pendulum balance. On the other hand if the cylinder C is made of large volume, not only may the apparatus be cumbrous, but the large volume of gas inclosed at any instant would necessitate a large rate of flow of gas through the apparatus in order that at any instant the gas in the cylinder may be a true sample of the gas at the source of supply. Fig. 2 shows a form of the apparatus in which a virtually large volume of gas is weighed, but in which only a small fraction of such large volume is inclosed at any instant, and which provides for the practically frictionless gas tight movement of the piston P. The piston P takes the form of an inverted shallow cup or bell in a liquid. Instead of a cylinder of equal diameter throughout its length, we employ an inverted shallow cup 7 of larger diameter than P to which is united a long tube 8. The piston P and the inverted cup 7 dip into a liquid seal contained by the annular vessel 9. A long dependent rod 10 and weight 11, is attached to the piston P, and the said rod is suspended from the pendulum balance beam B; the arrangement being such that the piston is constrained laterally without friction, and is free to rise or fall slightly in the liquid seal under the control of the pendulum balance when subjected to the pressure of gases of varying specific gravity.

Since the pressure at any point in a fluid varies with the depth of that point below the free surface, if the piston areas in Figs. 1 and 2 are equal, and if the heights of the cylinder C and tube 8 from the upper surface of their respective pistons to the vent hole 2 are also equal, the pressure on the upper surface of the pistons are also equal.

The apparatus may be arranged in many forms. For example, Fig. 3 shows one form in which the long tube 8 is directed downward, and the vent hole is at the bottom. The gas presses on the under side of the piston P which dips in the liquid seal contained in the shallow cup 7. The balance beam may now be conveniently placed above the piston, the piston being suspended therefrom. But the essential features of the invention are the same, and the two arrangements shown in Figs. 2 and 3 are only intended to be illustrative of many possible arrangements. For example when the apparatus is used as a gas regulator so that the rate of flow shall not be affected by the varying density of the gas, the movement of the piston may be controlled by a spring. This is shown in Fig. 3, the piston being suspended by means of the spring 12, adjustable by the screw and nut 13.

As examples of the useful applications of the apparatus, it may be connected to the flue of a furnace or to a town gas main. In the former case the varying specific gravity of the combustion product gases may be used to estimate the percentage of carbon dioxid. In the latter case, the varying specific gravity of the town gas may be used to estimate its varying calorimetric value. In the case of gas for lighting or heating, the apparatus can be made to regulate the flow of the gas so as to approximate to any desired result. This is accomplished by attaching, or connecting by suitable means, a valve V to the piston P, as shown in Fig. 3, so that as the position of the piston P is altered as the gas inside the cylinder varies in density, the distance of the valve V from its seating 6 also varies. Thus if the pressure of the gas in the main or in the inlet pipe 1 above that of the atmosphere is supposed to be constant, and the outlet area at 6 is constant, as the density of the gas increases the mass of the gas discharged per unit of time decreases. But an increase of specific gravity of the gas causes the valve V (Fig. 3) to move away from its seating 6, thus increasing the effective outlet area. The adjustment of the various parts may be such that the increase of outlet area may counteract the increase of density of the gas; thus the apparatus would form a regulator giving approximately constant mass of gas per unit of time. When the apparatus is thus used only to regulate the flow of gas, an index pointer and scale are not necessary.

Instead of a piston or bell dipping in a liquid seal, we may use a flexible diaphragm of the type well known in connection with aneroid barometers and the like.

Fig. 4 shows the apparatus applied to actuate a valve V which controls the rate of flow of gas supplied by the inlet pipe 11 and discharged by the outlet pipe 12. The said gas may be from the same source of supply as the gas supplied by the inlet pipe to the tube 8, or it may be from an independent source. In the former case, the apparatus can be made to give a constant rate of discharge of gas under pressure at the outlet pipe 12, although the density of the gas changes. The pressures of the gas at the inlet pipe 11 and outlet pipe 12 may be above that of the atmosphere, as in town gas supply, the supply of the same gas to the inlet pipe to the tube 8 should be at little or no appreciable pressure. It should be noted that the apparatus does not regulate the rate of flow under varying pressures, at the main, but only regulates the rate of flow under varying density of the gas. An ordinary pressure governor can be used in conjunction with the apparatus.

What we claim as our invention is:

1. The combination with a container for a column of gas open to the atmosphere at one elevation, of a movable gas bell subjected to the pressure of gas in said column at another elevation, and a means for counterbalancing said pressure.

2. The combination of a gas chamber having an inlet connection thereto, an outlet from said chamber open to the atmosphere at a different elevation, a movable member subjected on one side only to the differential pressure of the gas in said chamber at a different elevation, and means for exerting upon said movable member a counterbalancing force variable with the displacement.

3. The combination with a container for a volume of gas in open communication with the atmosphere at one elevation, of a movable member subjected on one side only to the pressure of gas in said container at a different elevation, and means for counterpoising said movable member with a variable force.

4. The combination with a container for a column of gas having open communication with the atmosphere at one elevation, of a piston having an area greater than the section of said column, means for subjecting said piston to the pressure of said column of gas at a different elevation, and means for exerting upon said movable member a counterbalancing force variable with the displacement.

5. The combination with a container for a volume of gas, of a movable member subjected on only one side to the pressure of gas in said container at one elevation, a discharge conduit for the gas in said container to the atmosphere, said conduit being positioned at a different elevation, and means for counterbalancing said movable member.

6. The combination with means for constantly discharging gas into the atmosphere at one elevation, of a piston subjected on one side only to the pressure of the gas at a different elevation, and a variable means opposing said pressure of the gas.

7. The combination with a container for a column of gas discharging into the atmosphere at one elevation, of a movable member having an area greater than the section of said column, means for subjecting said movable member on one side to the pressure of gas in said column at a different elevation, and means for counterpoising said movable member with a force varying with position.

8. The combination with a container for a volume of gas in open communication with the atmosphere at one elevation, of a movable member at a different elevation, subjected on one side to the pressure of gas in said container, the other side of said member being subjected to a substantially constant pressure, and means for counterbalancing said movable member.

9. In an apparatus for gas of varying density, the combination with a container for a volume of gas in open communication with the atmosphere at one elevation, of a movable member subjected on one side to the pressure of said gas, and means for counterbalancing said movable member and for regulating the rate of flow of gas, operating upon the movement of said movable member.

10. In a gas operated apparatus, means operated by variations in the specific gravity of the gas passing therethrough for varying the restriction to the gas to effect a substantially constant rate of flow of the gas.

In testimony whereof we affix our signatures in presence of two witnesses.

JOHN FREDERICK SIMMANCE.
JACQUES ABADY.

Witnesses:
   O. J. WORTH,
   C. P. LIDDON.